United States Patent

[11] 3,538,995

[72] Inventor Mario Buligan
 via San Vito 37, Bannia, Udine, Italy
[21] Appl. No. 717,792
[22] Filed April 1, 1968
[45] Patented Nov. 10, 1970
[32] Priority June 5, 1967
[33] Italy
[31] 7,051A/67

[54] SCRAPER FOR LOADING GRANULAR MATERIAL
 1 Claim, 5 Drawing Figs.
[52] U.S. Cl. .................................................. 198/103,
 198/9, 198/213
[51] Int. Cl. ..................................................B65g 37/00,
 B65g 65/06
[50] Field of Search ........................................... 198/213, 7,
 9, 214, 217; 37/189, 190, 191, 192; 56/220,
 221

[56] References Cited
 UNITED STATES PATENTS
 1,250,244 12/1917 Thompson.................... 198/212

| | | | |
|---|---|---|---|
| 2,509,543 | 5/1950 | Truax........................... | 198/213 |
| 2,665,655 | 1/1954 | Brown........................... | 37/189 |

FOREIGN PATENTS
1,256,604 2/1961 France ........................ 198/213

*Primary Examiner*—Richard E. Aegerter
*Attorney*—Sandoe, Neill, Schottler & Wikstrom ABSTRACT: A helical scraper associated with a conveyor for collecting aggregates from a heap on the ground and conveying them, for example into a concrete mixer. The helical scraper has the form of a cylinder with helical scraper bands extending around its circumference, the cylinder being formed by two end rings interconnected by bars and one horizontal end of the conveyor extending into the interior of the cylinder which is rotatable and kept in constant engagement with the heap of material to be conveyed by a counterweight system attached to the foot portion of a base on which the conveyor and scraper are swingably mounted. During rotation of the cylindrical scraper the aggregates are scraped in by the scraper bands provided with blades and when they arrive at the upper portion of the cylinder the aggregates drop onto the underlying conveyor belt which convey them upwardly to the point of utilization, usually a concrete mixer.

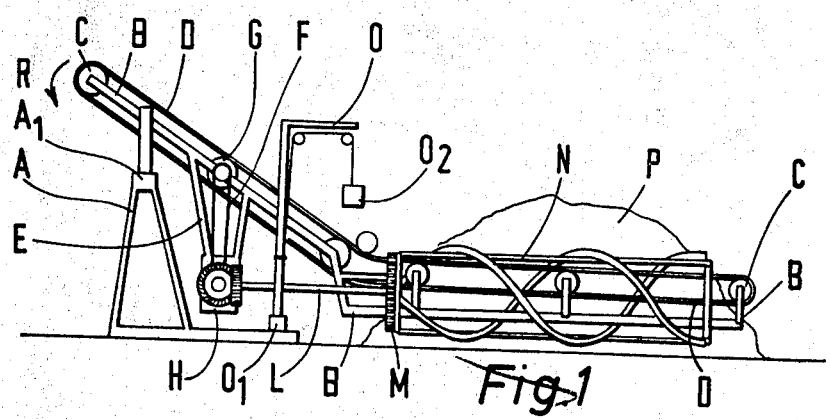
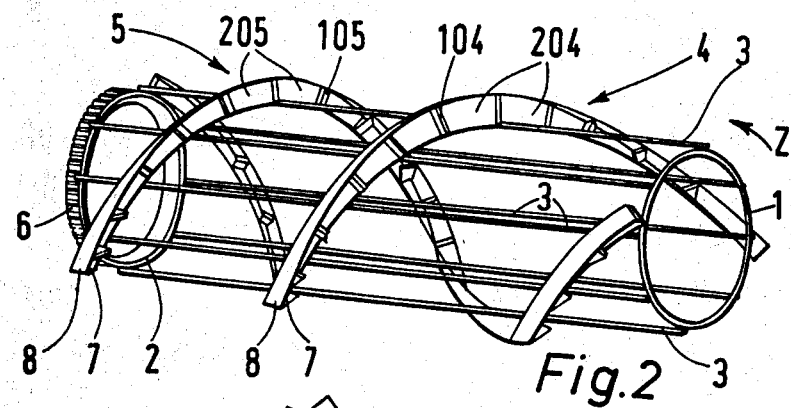
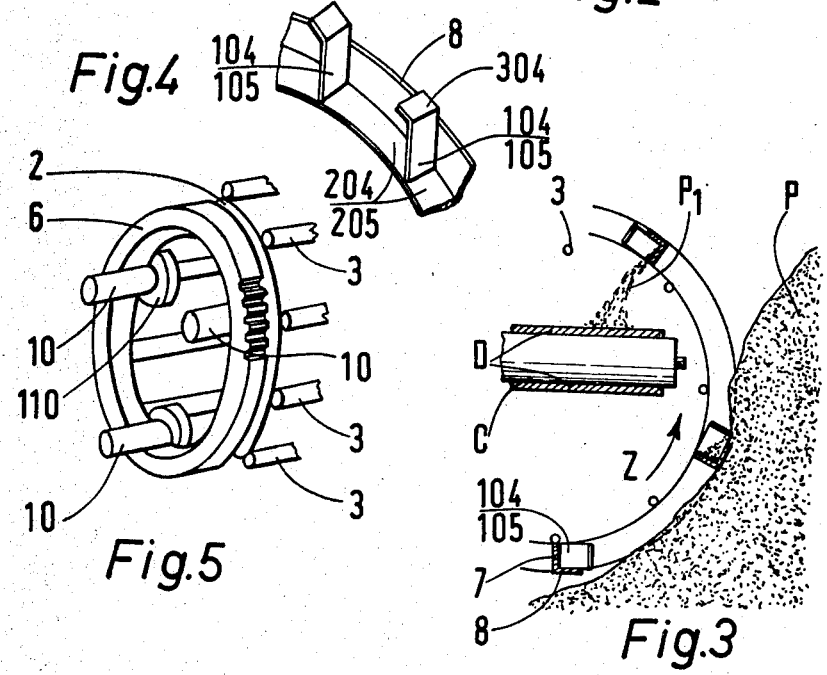

SCRAPER FOR LOADING GRANULAR MATERIAL

The present invention relates to a scraper for loading granular material, in particular gravel and sand for making concrete.

The known machines for taking up, conveying and unloading the aggregates to be introduced into the concrete mixers for the preparation of the concrete mixture are substantially based on the principle of a movable chain provided with a series of blades which, scraping in the heap of material to be conveyed, are filled therewith and carry it to its destination on a generally upwardly inclined path.

The present invention relates to a loading scraper in which the blades are not secured to a conveyor chain and do not swing dangerously to cause possible accidental unloading of the material being conveyed, but are incorporated in a metal scraper band integral with an elongated cage or basket rotating about a part of the conveyor belt. The scraper band extends from one end of the basket in a helical line around the basket formed of bars connected to one another by two end rings. The basket is brought into contact with the heap of material to be loaded, in its longitudinal direction, and its rotating movement ensures that part of the scraper will always be in a condition to fill the blades which in turn are unloaded on to the conveyor belt. As the movable conveyor belt passes longitudinally though the interior of the basket, the blades incorporated in the scraper and distributed along the helical line thereof will be cyclically located in position for loading and unloading and the belt receives the material over its complete extension between the ends of the scraper band.

This continuous unloading and uninterrupted conveyance affords a considerable advantage which has a favorable influence on the working time employed for filling the concrete mixer. Further, a better utilization of the material to be loaded is obtained as the scraper has a working region of the same length as that of the basket or, if you want, as that of the heap to be loaded. The scraper can be made to work razing the ground over the entire length of the basket and as the latter is mounted on a movable arm of the machine and as this arm is subjected to a constant lateral thrust due to a counterweight system, the basket will slowly advance radially at the same rate as the material to be loaded is removed so that no residual heap is left on the ground.

These and other features of the invention and the advantages resulting therefrom will clearly appear from the following description of a preferred embodiment thereof, illustrated by way of a nonlimiting example in the accompanying drawing, in which:

FIG. 1 shows schematically in lateral elevation a complete elevator;

FIG. 2 shows the basket in a perspective view with the incorporated helical scraper;

FIG. 3 shows how the helical scraper works, in vertical section;

FIG. 4 shows a detail of the helical scraper with two blades thereof; and

FIG. 5 shows the end of the basket on the machine side in perspective view.

Referring to FIG. 1, the complete machine is formed of a base A on which a movable arm B is pivotally mounted at A1. On this arm rollers C are mounted on which the endless conveyor belt D runs. This belt comprises a horizontal receiving portion and an upwardly inclined portion for conveying the material upwards. A support for mounting a motor is provided on this arm and the shaft of this motor transmits movement both to the conveyor belt by means of a transmission F and a driving roller G, and a basket N by means of a pair of gear wheels H, a shaft L and another pair of gear wheels M. Pivotally mounted at O1 on the foot portion of the base is a device O provided with a counterweight O2 which pushes the movable arm constantly against the Heap P of material to be loaded so that the horizontal basket will always engage the material until the same is exhausted. The basket, which rotates tangentially on the material, removes it and unloads it on to the belt which in turn conveys it to the point of utilization R.

This operation is carried out continuously and regularly and, as far as possible, over the entire length occupied by the material on the ground and, in any case, over the entire length of the basket itself.

Referring to FIG. 2, the basket is formed of a cylindrical metal cage made of sectional elements, preferably rods. Two rings 1 and 2 form the ends of the cage and are connected to each other by a series of bars 3 arranged at several points along the circumference of the rings and in a number sufficient to give the assembly a certain degree of rigidity. Two L-shaped metal bands forming scrapers 4 and 5 start from diametrically opposed points of one of the end rings 1 and, after extending each in a helical line over the entire length of the basket, reach the opposite ring 2, remaining always parallel to each other. The blades 104 and 105 are secured at regular intervals between the two flanges 7 and 8 of the L-shaped band forming the scraper and divide the helical band into many small portions 204 and 205. The distance between these blades depends upon the diameter and the length of the basket as well as the quantity of material to be conveyed to utilization.

The rotating movement of the basket is in the direction of the arrow Z. The scrapers 4 and 5 are secured to the basket by one flange 7 of their L-shaped profile extending always in the radial direction, whereas the other flange 8, that is the outer one, extends perpendicularly to the first one. It follows that when one blade is located in the lowest position it will scrape in the material on advancing and feed it into the compartments 204 and 205 between one blade and another. When this blade comes near its highest position the material will escape under the action of gravity from the side opposed to the scraping side 8 on to the underlying movable belt.

Referring to FIG. 3, the dynamics of scraping in the heap P and of unloading of the material P1 on to the movable belt are illustrated in a half section in elevation of the basket. The three blades 104 and 105 represent the various positions of one single blade which moves in the direction of the arrow Z, but they may also be interpreted as being any three different blades of one helical band in the helical portion which in projection on the plane of the section are located within an angle of 180°. The continuous scraping movement carried out by the scraping band is clearly evident from FIG. 3. A portion of the flange 8 of the scraping band will always be receiving the material into its associated compartment until the latter reaches a point at which the material will fall under the action of gravity on to the underlying belt D running on the rollers C.

Referring to FIG. 4, the blades 104 (or 105) forming the compartment 204 or 205 are firmly secured to the scraper between its two flanges 7 and 8 and are slightly higher than the scraping flange 8. Further, the scraping side of each blade has a bent-off portion 304 extending in the direction of movement so as to facilitate scraping in of the heap.

Referring to FIG. 5, the ring 2 of the basket, directed towards the machine, is provided with a crown gear indicated by 6 in FIGS. 2 and 5 and by M in FIG. 1 and coupled with one or more driving pinions so as to transmit the movement of the motor to the basket. This basket is supported in cantilever fashion and guided by three rollers 10 which are mounted on the movable arm B of the base and are in contact with the inner circumference of the gear wheel 6. Each roller 10 is provided with a circular flange 110 which engages the inner edge of the crown gear 6 to avoid axial movement of the basket.

It will be understood that the foregoing description has merely been given as an illustrating example and that therefore numerous, especially constructional, modifications and variations can be made therein without departing from the scope of the inventive concept as described above and claimed hereinafter.

I claim:

1. A scraper for loading granular material, comprising:
    a base member;
    a movable arm pivotally mounted in cantilever fashion on the base member and including a pivotally supported upper inclined portion and a horizontally extending lower portion;

an endless conveyor belt operatively supported on and longitudinally of the movable arm;

an elongated scraper basket formed of a plurality of bars connected at their ends by a ring and surrounded by L-shaped scraper bands;

a motor operatively connected to the endless conveyor belt and the scraper basket for driving the same;

a counterweight system connected to said movable arm so as to constantly hold said elongated scraper basket in engagement with a heap of granular material;

said elongated scraper basket carrying a crown gear at its end facing said base member, said crown gear meshing with a pinion driven through a shaft by gearing coupled to said motor; and said movable arm rotatably carrying a plurality of rollers arranged to engage with their peripheral surfaces the inner peripheral surface of said crown gear and with an adjacent circular flange an inner edge of said crown gear.